United States Patent Office 3,827,893
Patented Aug. 6, 1974

3,827,893
SILICATE BODIES
Helmuth E. Meissner, Painted Post, and Stanley D. Stookey, Corning, N.Y., assignors to Corning Glass Works, Corning, N.Y.
No Drawing. Continuation of abandoned application Ser. No. 45,907, June 12, 1970. This application Feb. 22, 1972, Ser. No. 228,299
Int. Cl. C04b 35/16
U.S. Cl. 106—74
15 Claims

ABSTRACT OF THE DISCLOSURE

This invention relates to the discovery that when certain esters or inorganic salts which hydrolyze to weak acids are added to true solutions, colloidal solutions, and suspensions of soluble silicates containing more than 1 mole of silica per liter and having a pH greater than about 10, a reaction will take place wherein the pH will be reduced and the silica will polymerize into a network structure. The reacted body may then be fired below the softening point of the polymerized product to form a glass article having a geometry similar to that of the original body or may be treated so as to form a self-supporting, monolithic porous body which, if desired, can be consolidated by heat to a glassy body.

---

This is a continuation of application Ser. No. 45,907, filed June 12, 1970, and now abandoned.

BACKGROUND OF THE INVENTION

Soluble silicate solutions, usually alkali metal or quarternary ammonium silicates, are well known to the art. These solutions normally have a pH greater than about 10 so that the silica present therein is in solution. The concentration of silica in solution will vary with a particular soluble silicate selected. The prior art teaches that polymerization of the silica can be caused by a reduction in a pH of the solution. This polymerization normally results in a material known as a silica gel. The silica gels when dried form a xerogel. These dried gels are particulate and quite weak.

Copending U.S. patent application Ser. No. 45,806, filed of even date with Ser. No. 45,907 by J. E. Pierson and S. D. Stookey, describes the process for producing porous silica bodies from soluble-silicate solutions utilizing formaldehyde, paraformaldehyde, and/or formamide as the gelation agents. That process requires the preparation of true solutions, colloidal solutions, or suspensions of soluble silicates and the aforementioned gelation agents. These solutions and/or suspensions must contain concentrations of silica greater than about 1 mole per liter in solution. Although it may be desirable to have as much silica as possible in the solution, as a practical matter, it is difficult to obtain concentrations greater than about 12 moles per liter. Since silica itself is insoluble, the silica is added in the form of a soluble silicate which is normally an inorganic alkali metal silicate or an organic ammonium silicate, preferably, a quaternary ammonium silicate. The ratio of the alkali metal oxide or quaternary ammonium ion to silica can vary, but the amount of silica in solution must be at least 1 mole per liter. The concentration of alkali metal oxide or quaternary ammonium ion must be sufficient to produce a pH greater than about 10, but the concentration should not be too high. Normally it is preferred to maintain the pH below about 15. To the soluble silicate solutions, the aforementioned organic gelation agents are added which uniformly dissolve in the solution to react slowly and uniformly throughout the solution to partially neutralize the alkali present and consequently polymerize the silica. This neutralization commonly causes a reduction of the pH of the solution from greater than 10 to the range of about 7–9. The desired concentration of the organic present in the solution is related to the alkali oxide and/or ammonium ion present. If the organic concentration is very high, undesirable instantaneous gelation of the solution can occur; or, on the other hand, if concentration is too low the desired products cannot be produced. When the ratio of the organic to the alkali oxide and/or ammonium ion assumes particular values, a material which is leachable in cold water to a porous silica material can be produced.

The solutions and/or suspensions of soluble silicate and organic compound are reacted by treating them at moderately low temperatures for a sufficient length of time to cause the reaction to occur. The reaction temperatures can be between the freezing point and the boiling point of solution. Normally, reaction temperatures are between 40° C. and 100° C. and for times between a few seconds, say five seconds, and 720 hours. The reaction which occurs can be viewed as a phase separation; that is, the organic material reacts with the alkali oxide and/or ammonium ion so as to produce a less basic solution wherein the silica may then polymerize to form the desired product. After the reaction has taken place, the products described above are washed in water, acids, or other suitable solvents and then may be utilized for various purposes. In the case of the water-leachable solids, the material is washed in water so as to remove the water soluble phases and thus leave a coherent, open-celled, porous silica material. The network which remains, after leaching, is essentially pure silica. It is believed that with the lower organic ratios there is not a sufficient amount of the organic present to allow the reaction to proceed sufficiently to secure the formation of a silica network.

Copending U.S. patent application Ser. No. 45,905, filed concurrently with Ser. No. 45,907 by F. L. Orso and T. E. Pierce, said former application now being abandoned but having been refiled as Ser. No. 228,298 on Feb. 22, 1972, discloses that this reacted body, i.e., the unleached body, can be fired in a particular manner to consolidate the reacted body into a solid glass article with essentially the same body geometry.

SUMMARY OF THE INVENTION

We have discovered that solid glass bodies and self-supporting, monolithic, porous bodies exhibiting a range of pore sizes and total porosity can be produced from true solutions, colloidal solutions, and suspensions of soluble silicates by adding certain gelation agents thereto selected from the group consisting of esters and inorganic salts which hydrolyze to weak acids. These solutions and/or suspensions should contain concentrations of silica of at least 1 mole/liter in solution with 12 moles per liter being a practical maximum. Suitable solutions, colloidal solutions, and suspensions include: the alkali metal silicates, lithium silicate, sodium silicate, and potassium silicate; the organic ammonium silicate, quaternary ammonium silicate; and colloidal silica. The pH of the solutions, colloidal solutions, and suspensions must be higher than about 10 with the preferred maximum being less than 15. Whereas the solutions and/or suspensions must contain at least 1 mole per liter of silica in solution, higher concentrations are much to be preferred. Therefore, in general, a silica concentration of at least 3 moles per liter is deemed a practical minimum. These gelation agents, when homogeneously dispersed or dissolved throughout the solutions and/or suspensions, react relatively slowly and uniformly to neutralize the alkali oxide and/or ammonium ion present such that the pH of the solutions and/or suspensions is reduced sufficiently to polymerize a silica network.

The gelled or reacted body may then be fired in such manner as to form a solid glass article having a geometry similar to that of the original body, or it may be subjected to a leaching treatment to remove the soluble phases and thereby leave a self-supporting, porous silica network. A range of pore sizes and total porosity can be tailored into this porous silica body which exhibits good mechanical strength. Finally, this porous body can generally be consolidated by firing to yield a solid glass article.

DESCRIPTION OF THE PREFERRED EMBODIMENT

We have discovered that certain organic esters and inorganic salts may be substituted for, or used in addition to, the gelation agents disclosed in the aforementioned copending applications. Referring first to the utility of these esters as gelation agents, we have found that they will dissolve in the various soluble silicate solutions and hydrolyze to an organic acid and an alcohol to thereby reduce the pH of the solution to a value that is effective, normally about 8-10, for polymerization of silica network. Thus, the properties of the ester must be such that it will be soluble in the silicate solutions and will hydrolyze to an acid and alcohol which will reduce the pH of the solution. The minimum amount of an ester which is effective is about 2% by volume. In general, we have found that those esters which contain no more than 4 carbon atoms will have sufficient solubility to dissolve in the solution and react therewith. Although esters which have five carbons may be used, we prefer to use those esters selected from the group consisting of methyl acetate, ethyl acetate, methyl formate, and ethyl formate. As can be seen, these esters will hydrolyze to methanol, ethanol, and acetic acid, or formic acid depending upon which ester is selected. In all cases, these esters will provide the desired reaction to cause the silica to polymerize. We have found that, from an empirical point of view, we can use anywhere from between 2 to 20 volume percent of the ester in the solution. Above about 20%, the gel tends to disintegrate due to formation of crystalline species of reaction products; whereas below 2%, there is not a sufficient amount of ester present to cause gelation. As a practical matter, we prefer to employ ester concentrations between 3 and 10% by volume with about 4% being the optimum amount. The aforementioned esters, when used in those concentrations, will homogeneously dissolve in the solution and then uniformly react to produce the gel having a polymerized network therein.

The reaction conditions, including time and temperature, are similar to those disclosed in the aforementioned copending application. Hence, reaction temperatures between the freezing point and the boiling point of the solutions are operable with higher temperatures being suitable where the reaction is undertaken at elevated pressures. In general, the reactions are carried out at atmospheric pressure utilizing temperatures between 40°–100° C. for times ranging between a few seconds, e.g., 5 seconds, and 24 hours. Reaction or "curing" periods up to 720 hours have been employed but with no substantial improvement in properties when compared with bodies produced after shorter reaction times.

The reaction mechanism may be likened to a phase separation, i.e., the ester acts to neutralize some of the alkali oxide and/or ammonium ion present to yield a less basic solution wherein the silica can polymerize to form the desired silica network. This polymerization is aided by a concurrent replacement of water of hydration at the silica species with undissociated ester and with alcohol liberated during the saponification reaction of the ester. The products of the reaction are solid bodies having a porous silica network therein which, after being washed in water or other suitable solvent, can then be utilized for various purposes. However, these reacted or "cured" bodies may be subsequently treated in two ways to produce articles having markedly differing physical structures.

First, the body can be rendered reasonably uniformly porous through a leaching step or by air-drying and/or firing in such a manner as to expel the volatile materials therefrom. In leaching the body, it is contacted with such suitable solvents as water, alcohols, ketones, or acids which will dissolve the soluble phases, i.e., the gelation agent and the alkali and/or ammonium ion, to thereby leave a porous structure composed essentially of silica. In the volatilization process, the cured body is fired at a sufficiently elevated temperature to expel the volatile constituents therefrom (commonly any organic material and ammonia, if present) but below the deformation temperature of the body such that slumping of the body with consequent filling of the pores will not occur. In both practices, the resultant article exhibits a self-supporting, monolithic structure demonstrating sufficient mechanical strength to permit handling and physical shaping. The structure of the article can be tailored to yield relatively uniform pore sizes varying between about 100–20,000 A. with total porosities ranging between about 30–85%. It is apparent that this ability to control pore size and total porosity augurs great utility for those products as filter materials or porous support materials which may be impregnated with desired soluble compounds. Finally, if desired, these porous products can be fired at a sufficiently high temperature to consolidate the open structure to a dense silicate glass article.

The second manner of treating the cured body involves firing the body at such temperatures that the volatile materials will be expelled and the structure consolidated to produce a solid glass article having a geometry similar to that of the original cured body. In this technique, the volatile components normally comprise any organic material and ammonia, if present from the quaternary ammonium ion. However, any alkali metal oxide will remain in the product and will act as a flux to reduce the consolidation temperature required. Thus, the consolidation temperature will generally range in the vicinity of the glass softening point which, for the glasses contemplated herein, will vary between about 500°–1500° C. The softening point of a glass has been defined as that temperature at which the glass exhibits a viscosity of $10^{7.6}$ poises. In carrying out the firing, the rate of heating the cured body to the required consolidation temperature is governed only by the desire to avoid excessive bubbling and cracking and the final heating temperature should not be so high as to result in deformation of the article. Physical supports therefor, such as formers and saggers, are very useful in assuring absence of deformation.

To prepare the true solutions, colloidal solutions, and suspensions of the invention, reagent grade inorganic salts, methyl formate, methyl acetate, ethyl formate, and ethyl acetate were employed. The silicate materials utilized have been the commercially-marketed preparations set out below in weight percent:

Colloidal silica—30% $SiO_2$, balance water
Potassium silicate—8.3% $K_2O$, 20.8% $SiO_2$, balance water
Quaternary ammonium silicate—9.8% quaternary ammonium ion, 45% $SiO_2$, balance water
Sodium silicate—6.75% $Na_2O$, 25.3% $SiO_2$, balance water
Lithium polysilicate—2.1% $Li_2O$, 20% $SiO_2$, balance water Uniform gelation could not be obtained with the potassium or sodium silicate solutions alone, but only in mixtures with the colloidal silica and/or quaternary ammonium silicate solutions.

To facilitate and better understand the use of esters in soluble silicate solutions the following examples are presented:

EXAMPLE I

A colloidal solution was prepared by combining 50 cc. of the commercial potassium silicate solution referred to above with 50 cc. of the commercial colloidal silica solution also referred to above and thereafter adding 4 cc. methyl acetate thereto. After vigorously stirring this sol for one minute, it was transferred to inert plastic containers to produce liquid levels of about 5 mm. The containers were subsequently closed and the solution solidified to a hard, transparent body therein after heating at 50° C. for 15 minutes. Further heating for one hour at 50° C. caused this body to shrink about 1%. After cooling to room temperature, the container was opened to the ambient atmosphere and the body became air-dry in about four days.

The air-dried, self-supporting, porous, plate-like article was thereafter placed on a refractory brick which had been covered with powdered calcined $Al_2O_3$ to permit even shrinkage during consolidation. The article was heated at 50° C./hour to 450° C., held thereat for four hours, and then heated at the same rate to 650° C. Consolidation of the body to a transparent glass article took place in about 20 minutes at that temperature. The total shrinkage in one dimension from the initial wet gel to this final glass article amounted to about 40% but the body geometry of the final article retained the proportions of the original sample, however.

EXAMPLE II

To a colloidal solution resulting from mixing 50 cc. of the potassium silicate and 50 cc. of the colloidal silica solutions described above, 20 cc. of methyl acetate is vigorously stirred therein for one minute. This sol was transferred to a plastic container as recited in Example I, the container closed, and the solution cured at 50° C. for one hour to a hard, transparent body. After cooling to room temperature, the body was air-dried in the ambient atmosphere for about four days.

The air-dried material was then consolidated to a transparent glass article employing the same firing schedule as that described in Example I. Because of the high content of methyl acetate in the initial sol, the total shrinkage from the initial wet gel to the consolidated glass article was greater than 50% and several of the articles demonstrated a tendency to crack during the drying and firing steps. Therefore, the addition of 20% by volume of the ester appears to constitute a practical maximum.

EXAMPLE III

The procedure of Example I was adhered to except that only 2 cc. of methyl acetate were admixed to the colloidal solution of a mixture of potassium silicate and colloidal silica. Curing at 50° C. for 10 hours developed a gel which was not as hard as that produced in Examples I and II. For this reason, 2% by volume of the ester appears to comprise a practical minimum. After air-drying the porous body was consolidated to a glass article in accordance with the method of Example I.

EXAMPLE IV

Into 100 cc. of a silica sol as described in Example I, 4 cc. of methyl formate were thoroughly admixed. The solution solidified to a hard gel within about 15 seconds at room temperature. Actually, the viscosity of the solution became markedly greater even after a period of only 2-3 seconds. Curing, air-drying to yield a self-supporting, monolithic, porous body, and subsequent firing to obtain a glass article can be accomplished following the procedure described above in Example I.

The use of methyl formate as the ester promotes gelation of the silicate solutions at the most rapid rate and, therefore, can be very advantageous from a commercial point of view. Mixtures of the various esters permits the time of reaction to be closely controlled.

EXAMPLE V

The relatively low solubility of ethyl acetate in aqueous solutions and its comparatively slow rate of hydrolysis, while not precluding its use in this invention, seriously retard the development of desirable products thereby.

Thus, 4 cc. of ethyl acetate were dispersed as an emulsion in a mixture of 50 cc. of the sodium silicate solution referred to above and 50 cc. of the colloidal silica solution also recited above. Hard gels were formed in closed containers after 15 hours at 85° C.

Air drying at room temperature to secure integral, monolithic, porous bodies and subsequent firing to achieve glass articles followed the procedures therefor set out in Example I.

EXAMPLE VI

To a mixture of 50 cc. of the commercial quaternary ammonium silicate solution referred to above and 50 cc. of the above-cited potassium silicate solution were admixed 4 cc. of ethyl formate. Gelation to a hard body occurred within about two minutes at room temperature. Curing, air drying to a porous body, and consolidating to a glass article follow procedures similar to those reported in Example I.

EXAMPLE VII

In general, the alkalinity of the commercially-marketed colloidal silica solution is not sufficiently great to insure the essentially complete hydrolysis of the added ester within a practical length of time. Nevertheless, the addition of up to about 10% by volume ammonia to the silica sol will markedly reduce the gelation time thereof after mixing with the ester. Furthermore, upon such additions of ammonia, the material in the gel state continued to harden much more rapidly. Such is an important factor in commercial production inasmuch as processing times would be decreased significantly.

Thus, 10 cc. of concentrated, reagent grade $NH_4OH$ were stirred into 100 cc. of the above-mentioned colloidal silica solution and thereafter, 4 cc. of methyl formate admixed thereto. A gel began to form at room temperature within 3 minutes and was reasonably well-hardened within about 15 minutes. An integral porous body was obtained after curing and air drying following the procedure of Example I. Finally, the porous body was consolidated to an opaque glass article having a dimensional geometry retaining the proportions of the original body but with a shrinkage of about 50%.

A transparent glass article was produced where the reacted gel was treated in an extraction apparatus with nitric acid to remove traces of alkali and thereafter air-dried and fired.

EXAMPLE VIII

This invention enables the production of articles containing fillers. The use of fillers to improve the mechanical strength, alter the electrical properties, modify the thermal characteristics, incorporate catalytic materials into the silica network, etc. of various products is well-known to the art.

As illustrative of this capability, 50 g. of commercial silicic acid, $H_2SiO_3 \cdot nH_2O$, received from Fisher Scientific Company were gradually stirred into a solution of 100 cc. of the above-recited colloidal silica and 10 cc. concentrated, reagent grade $NH_4OH$. After four hours of stirring, 4 cc. of methyl formate was admixed to the suspension. Within about two minutes, the viscosity of the suspension began to increase. When the viscosity became sufficiently high to preclude sedimentation of the suspended silicic acid (about 5 minutes), the suspension was poured into the plastic molds where solidification to a hard white gel took place in about 15 minutes. The samples were allowed to cool to room temperature and exposed to the ambient atmosphere for air drying to an integral porous article. Finally, the air-dried material was consolidated to an opaque glass article containing particles of silicic acid therein by firing to 1500° C. at a rate of about 100° C./hour. Shrinkage in one dimension from the initial gel to the consolidated glass article was determined to be about 20%. However, here again, the dimensions of the final glass article retained the proportions of the original sample.

Referring now to the utility of certain inorganic salts as gelation agents, we have discovered that such salts will, when added to the silicate solutions, colloidal solutions, and suspensions hydrolyze and yield products which will reduce the pH of the solution below that required to polymerize the silica. The operable inorganic salts have a common factor in that all belong to a class of compounds prepared by precipitation from aqueous solutions having a pH greater than 5 and containing cations with a valence of at least 2. Therefore, these salts are insoluble in slightly acidic, neutral, alkaline aqueous media. Those salt whose cations do not form anionic hydroxo complexes are also insoluble in strongly alkaline aqueous media. Nevertheless, all of the salts are soluble in mineral acids.

More specifically, the inorganic salts found operable in the invention consist of certain carbonates, hydroxides, borates, and phosphates of cations having a valence of at least 2. And, because of the low solubility of these salts in alkali silicate, quaternary ammonium silicate, and colloidal silica solutions, they are all compatible therewith for limited times.

Stoichiometeric amounts of the reactants are not required in these reactions. Whereas this situation permits the preparation of a wide variety of compositions, it also indicates that the reactions cannot be completely explained in terms of exact chemical equations. However, the following description of the action of inorganic salts on the soluble silicates is presented as an aid in understanding the reaction mechanism.

To illustrate the concept of this type of silica polymerization, laboratory studies were undertaken utilizing the relatively water-insoluble salt $$4MgCO_3 \cdot Mg(OH)_2 xH_2O.$$

According to its solubility product, a certain amount of basic magnesium carbonate will dissociate to reach the equilibrium state when placed in an aqueous medium of:

$$4MgCO_3 \cdot Mg(OH)_2 xH_2O \rightleftarrows 5Mg^{+2} + 4CO_3 + 2OH^- + xH_2O$$

This hydrolysis produces a pH of about 10.5.

The equilibrium is disturbed in the persence of an alkali silicate or alkaline colloidal silica solution and silica will polymerize for one or more of the following reasons:

(1) In asmuch as the pH of the alkaline silicate solutions is higher than 10, the hydrolysis of the inorganic salt causes a partial neutarlization of the alkali or ammonium ion;

(2) Magnesium ions in solution will partially replace alkali or ammonium ions surrounding the silicate ions or colloidal silica particles and, due to the divalent character of magnesium ions, the negative charge on colloidal silica is neutralized and the colloid become unstable; or (3) Dissociated magnesium ions require a certain amount of water for hydration which start silica polymerization by a salting-out effect that becomes increasingly important as the concentration of silica in the solution increases.

A series of pH measurements conducted as a function of time between the initial addition of $$4MgCO_3 \cdot Mg(OH)_2 xH_2O$$

and the onset of gelation demonstrated that neutralization of the alkaline silicate solution is not the only mechanism responsible for the polymerization of silica in that reaction. Thus, a rise in pH was initially observed indicating the release of OH$^-$ ions. This rise is deemed to be the result of the replacement of alkali ions immediately surrounding the silicate ions by magnesium ions and the beginning of polymerization. The subsequent decrease in pH value can be ascribed to the neutralization action effected by the hydrolysis of the salt.

The development of the silica network is believed to be a two-step process. Hence, as a first step towards polymerization, colloidal silica particles form which are surrounded by an inner layer of hydroxyl ions and by a more diffuse outer layer of alkali ions such that the colloid possesses an overall negative charge and the sol is thus stabilized. However, when the alkali ions partially are replaced with magnesium ions, the net negative charge of the colloid will be reduced because (a) magnesium ions have a smaller ionic radius than alkali ions and more hydrated Mg$^{+2}$ species can find a place in the outer layer and (b) because of the double positive charge of the magnesium ions. This neutralization of the negative charge in the colloid causes the silica to become unstable and, if this neutralization of charge were to occur suddenly, as would be the situation where hydrogen ions were added in the form of an easily-soluble acid or acid salt, the silica would then coagulate to a gel wherein the various silica colloid particles would be only loosely connected by a few Si-O-Si bridges. As opposed to that phenomenon, the dissolution of a difficulty-soluble salt like $$4MgCO_3 \cdot Mg(OH)_2$$

proceeds quite gradually such that a polymerization of the silica will occur relatively uniformly. The silica colloid particles are, therefore, able to coalesce yielding a continuously-polymerized silica network having alkali ions and magnesium ions incorporated in a regular manner.

The uniform and complete dissolution of the $$4MgCO_3 \cdot Mg(OH)_2$$

crystals in an alkali silicate solution was demonstrated through X-ray diffraction analyses of the air-dried gel. Thus, the gel was determined to be non-crystalline, indicating that the alkali silicate solution had been converted to a homogeneous alkali-magnesium silica polymer.

Therefore, in summary, the reaction of $$4MgCO_3 \cdot Mg(OH)_2$$

with alkali silicate solutions provides a continuously porous structure rather than the well-known glassy materials normally obtained in air drying alkali silicate solutions. Furthermore, these latter foam when heated above 100° C. since the water trapped therein will evaporate then.

The following examples illustrate the effectiveness of various inorganic salts in polymerizing alkali silicate, quaternary ammonium silicate, and colloidal silica solutons to an integral, porous body which can thereafter be consolidated through heat treatment to a glass article. The processing steps are basically the same for all the operable salts. Therefore, the individual process steps will first be discussed in general terms and the specific recited thereafter.

Finely-divided powders of the inorganic salts should be utilized since, because of the relative insolubility of the salts, a completely uniform reaction product will be very difficult to secure. The powder is gradually stirred into the silicate solution. Depending upon the reactivity of the particular inorganic salt and the nature of the individual silicate solution, this mixing will be performed between room temperature and the boiling point of the silicate solution in covered containers to prevent evaporation of water and reaction with CO$_2$ of the atmosphere. As the mixing continues under these conditions, the suspension increases in viscosity and, at a point when no sedimentation would occur without stirring, the mixture is transferred to plastic containers or molds of a desired shape.

The curing operation is essentially a continuation of the reaction between the inorganic salt and the silicate solution. After the transfer into closed plastic containers, the suspension soon gels at room temperature or at slightly elevated temperatures (up to about 100° C.), depending upon the nature of the sol. The wet gel then further reacts to a solid translucent gel, indicating complete reaction of the inorganic salt and its assimilation into the silica network structure. This curing normally varies between about 1-20 hours with longer times evidencing no deleterious effect but with no practical benefit either.

After curing, the gel is allowed to cool to room temperature, in those instances where curing was undertaken at elevated temperatures, and thereafter the plastic container opened and the gel exposed to the ambient atmosphere to air dry. In some cases, this free air drying will cause cracking of the gel so more elaborate drying methods such as steam drying, drying in controlled atmospheres, or the use of organic solvents may be required to secure a sound porous body. The time required for suitable air drying generally depends upon the geometry and thickness dimensions of the article and commonly is of the order of about 2-5 days.

The air-dried porous body can then be fired to produce a strong porous article or consolidated to a pore-free glass article. Care is generally necessary in the initial firing stages to allow water which had been absorbed within the silica structure to escape without bubbling. Where quaternary ammonium silicate solution constitutes a starting component, care must also be taken to insure complete decomposition and oxidation of organic carbon. The firing can be so controlled as to vary the pore size continuously from that of the air-dried material to the final stage of consolidation to a non-porous glass. Furthermore, the firing also affects the activity of the porous material, thereby permitting the formation of porous materials of varying activity.

One of the methods for determining the temperature at which the porous material became consolidated involves differential thermal analysis. Thus, it was determined empirically that consolidation is preferably accomplished at temperatures approximately 10°–100° C. below the temperature of devitrification of the glass which, of course, depends upon the composition of the sample. The time required for densifying the porous material to a glass has been found to be inversely proportional to the temperature maintained in the consolidation range. In general, times of between about 5-60 minutes within the consolidation range have been determined very satisfactory. Inasmuch as these glasses are commonly susceptible to devitrification, it is preferable not to expose the material for a period longer than necessary for consolidation.

It was observed that glass compositions having high silica contents with little alkali or other oxides demonstrated a markedly lower tendency to devitrify and, therefore, generally required less careful control of the consolidation conditions. Since these glass compositions are frequently quite difficult to produce through conventional glassmelting practices, this invention provides an important and economically favorable alternative method for manufacturing such glasses.

The following examples should be deemed illustrative only and not limiting of the invention. In general, the time of reaction increases in ascending order of the listed silica solutions: colloidal silica, quaternary ammonium silicate, lithium silicate, potassium silicate, sodium silicate. To insure against cracking or crazing of the glass articles, a controlled atmosphere was employed during the firing step. Thus, the firing was initiated in an environment of essentially 100% humidity which was gradually linearly reduced to finally expose the articles to the ambient atmosphere. In the following examples, water vapor comprised the humidity although it can be appreciated that atmospheres of methanol, ethanol, or other solvents would also be effective.

EXAMPLE IX

A solution composed of 50 cc. of the potassium silicate, referred to above, and 50 cc. of the quaternary ammonium silica, also noted above, was prepared in a closed plastic container and 10 grams of $4MgCO_3 \cdot Mg(OH)_2 \cdot nH_2O$ (40% by weight MgO content) stirred thereinto. After stirring the resultant suspension for 30 minutes in a bath of boiling water, the viscosity thereof had increased sufficiently to preclude the settling out of the salt when the stirring was stopped. Thereafter, the suspension was transferred to plastic molds, covered, and cured at 80° C. for 16 hours. The body appeared to be a translucent gel in which the salt was dissolved.

The gel was then contacted with absolute methanol at 50° C. for four days in the closed mold to replace most of the water in the body structure with methanol. After cooling to room temperature, the gel was dried in a controlled atmosphere for 3 days to yield an integral, self-supporting, air-dried porous body.

Where a consolidated glass article was desired, the air-dried body, after removal from the plastic mold, was first heated at 25° C. per hour to 450° C. and held thereat for 8 hours to insure complete oxidation of the organic ammonium complex. Thereafter, the body was heated to temperatures between 870°–930° C. for consolidation for periods of time ranging between about ¼–½ hour. The rate of this second heating is immaterial since the volatiles have already been removed in the first firing. Generally, rates of 50°–100° C./hour have been employed.

The consolidated article was a transparent $$K_2O\text{-}MgO\text{-}SiO_2$$

glass which was an isotropically shrunken replica of the original molded shape.

EXAMPLE X

Five grams of $PbCO_3$ were stirred into 100 cc. of the above-described sodium silicate solution. The reaction of the $PbCO_3$ with the sodium silicate solution proceeded so rapidly that after five minutes of stirring the viscosity of the suspension was sufficiently high to inhibit sedimentation of the $PbCO_3$ when the stirring was discontinued. The suspension was then transferred to a plastic mold, covered, and cured at 80° C. for about 16 hours. Thereafter, the resulting gel was cooled to room temperature treated with absolute methanol in accordance with Example IX, and air-dried in a controlled atmosphere for 5 days to yield an integral, monolithic, porous body.

Since quaternary ammonium silicate solution was not present, a heat treatment step such as was recited in Example IX to remove the organic complex was not required. Therefore, the porous body was merely heated at a moderate rate (normally about 50°–100° C./hour) to the consolidation range of 600°–700° C. and maintained thereat for about 10 minutes.

The final product was a $Na_2O\text{-}PbO\text{-}SiO_2$ glass article exhibiting isotropic shrinkage from the original molded shape.

EXAMPLE XI

Ten grams of $ZnCO_3$ were stirred into 100 cc. of the potassium silicate solution referred to above. After about 15 minutes of stirring, the viscosity of the suspension was sufficiently great to prevent the settling out of $ZnCO_3$. The gel was then cured and air-dried in the same manner as described in Example X to give an integral porous body. Finally, $K_2O\text{-}ZnO\text{-}SiO_2$ glass articles which were isotropic replicas of the original molded shape were secured by consolidating the air-dried porous body at 700° C. for about 1 hour.

EXAMPLE XII

Five grams of basic chromium carbonate were stirred into 100 cc. of colloidal silica solution which had been stabilized through the addition of ammonia. The slow reaction rate of the chromium carbonate with the solution required continuous stirring for about 30 minutes in a water bath to cause a sufficient increase in viscosity thereinto preclude sedimentation of the salt therefrom.

During subsequent curing in a covered plastic container at 80° C. for 16 hours, the chromium salt dissolved in the silica structure. The gel was then air-dried in a controlled atmosphere for four days to form an integral, self-supporting, porous body. Since the amount of ammonia present was small (about 5% by weight), no heat treatment at an intermediate temperature was required, such as that reported in Example IX.

Opaque $Cr_2O_3$-$SiO_2$ articles exhibiting isotropic shrinkage from the original molded shape were produced by consolidating the porous bodies at 1500° C. for ½ hour. Transparent $Cr_2O_3$-$SiO_2$ glass articles could be obtained following the above procedure when the amount of $Cr_2O_3$ was maintained below about 3% by weight.

EXAMPLE XIII

Basic lanthanum carbonate was prepared by precipitating a lanthanum nitrate solution with an excess of ammonium carbonate. The precipitate was filtered, washed repeatedly with hot water, and dried at 110° C. Ten grams of this lanthanum carbonate was suspended in 100 cc. of the quaternary ammonium silicate referred to above and then the mixture stirred at water bath temperatures until the viscosity thereof increased enough to permit transfer to plastic molds, normally about one hour. The plastic molds were covered and the gel cured for 16 hours at 80° C. after which it cooled to room temperature and air-dried in a controlled atmosphere for three days to an integral porous body.

The air-dried body was heated at 25° C./hour to 450° C. and held at that temperature for eight hours to oxidize the organic carbon from the quaternary ammonium silicate. The resulting porous article, consisting of $La_2O_3$-$SiO_2$, can be very useful as a catalyst because of the uniform distribution of the rare earth ion in the silica network.

EXAMPLE XIV

A slurry of five grams of $3ZnO \cdot 2B_2O_3$ with 20 cc. $H_2O$ was stirred into 100 cc. of the above-described potassium silicate solution. After 10 minutes stirring, the viscosity of the mixture was sufficiently high to preclude the settling out of the zinc borate. The material was then transferred to plastic molds, covered, and cured for one hour at 85° C. Thereafter, the gel was cooled to room temperature and air-dried in a controlled atmosphere to an integral porous body. Long curing times adversely affect the strength of the body but provide a method for varying the pore sizes of the air-dried material. Finally, the porous body can be consolidated to a $K_2O$-$ZnO$-$B_2O_3$-$SiO_2$ glass which is an isotropically shrunken replica of the original molded shape by firing between 700°–800° C. for about ½–1 hour.

EXAMPLE XV

Ten grams of $Pb(BO_2)_2 \cdot H_2O$ were added to 30 cc. $H_2O$ and the resultant slurry admixed into 100 cc. of the sodium silicate solution referred to above. After stirring the mixture for only about three minutes, extensive gelation thereof took place. The gel was transferred to a plastic mold, covered, cured for 15 minutes at 70° C., and air-dried at room temperature in a controlled atmosphere for two days. The thus-formed monolithic, porous body could be consolidated to a $Na_2O$-$PbO$-$B_2O_3$-$SiO_2$ glass article by firing at 700° C. for about ½ hour.

EXAMPLE XVI

A slurry composed of 10 grams aluminum borate in 20 cc. $H_2O$ and 10 cc. concentrated $NH_4OH$ was suspended in a mixture consisting of 50 cc. each of the above-described potassium silicate and quaternary ammonium silicate solutions. Gelation occurred after about four hours stirring of the suspension in a water bath. The material was then transferred to plastic molds, covered, and cured for 16 hours at 85° C. After cooling to room temperature, the gel was air-dried in a controlled atmosphere for four days, yielding an integral porous body.

The inclusion of quaternary ammonium silicate dictated a burn-out of the organic carbon prior to consolidation, in accordance with the practice recorded in Example XIII. Thereafter, a glass article which was an isotropically shrunken replica of the original molded shape could be formed by firing the porous body sample at 700° C. for about 45 minutes.

EXAMPLE XVII

A suspension was formed consisting of 10 grams $Pb(OH)_2$ in 100 cc. of the potassium silicate solution referred to above. The suspension was stirred in a water bath until a substantial increase of viscosity was noted therein, commonly after about one hour. Subsequently, the material was placed in plastic molds, covered, and cured at 85° C. for two hours. After curing, the gel was cooled to room temperature and air-dried in a controlled atmosphere for four days. The resultant self-supporting, porous body could then be consolidated to a glass solid of $K_2O$-$PbO$-$SiO_2$ by firing to 700° C. for about 15 minutes.

EXAMPLE XVIII

A porous body and a consolidated glass solid consisting of $K_2O$-$ZnO$-$SiO_2$ were formed in like manner to the procedure described above in Example XVII, except 10 grams $Zn(OH)_2$ were utilized instead of $Pb(OH)_2$.

EXAMPLE XIX

A suspension comprising 10 grams $Mg(OH)_2$ in 60 cc. of the potassium silicate and 40 cc. of the quaternary ammonium silicate solution described above was stirred in a water bath for about three hours to achieve sufficient viscosity therein to inhibit the sedimentation of $Mg(OH)_2$ therefrom. The suspension was subsequently transferred to plastic molds, covered, and cured for 16 hours at 85° C. Thereafter, the cured gel was cooled to room temperature and air-dried in a controlled atmosphere for three days to produce an integral porous body.

Finally, following an intermediate heat treatment to remove the organic carbon of the quaternary ammonium silicate, as exemplified in Example XIII, the porous material was consolidated to a $K_2O$-$MgO$-$SiO_2$ glass solid exhibiting an isotropically shrunken replica of the original molded shape by firing at 700°–800° C. for about ¼–1 hour.

EXAMPLE XX

Ten grams $Zn_3(PO_4)_2$ were stirred into a mixture of 50 cc. of the colloidal silica and 50 cc. of the potassium silicate solutions referred to above. Substantial gelation occurred after four minutes of stirring. The gel was cured for 10 hours at 85° C. in a covered plastic container. An integral porous body was obtained by air-drying the cured gel for four days at room temperature in a controlled atmosphere. Heating the porous body to about 450° C. yielded a strong body of open structure which would be useful as a filter medium or a catalyst support.

EXAMPLE XXI

A slurry of 10 grams of $AlPO_4$ in 20 cc. $H_2O$ and 10 cc. concentrated $NH_4OH$ was suspended in 100 cc. of the above-described potassium silicate solution. The suspension was stirred on a water bath for three hours to initiate substantial gelation. After transferring the material to covered plastic molds, it was cured at 85° C. for 16 hours. The cured gel was air-dried to an integral porous body after four days in a controlled atmosphere at room temperature. A solid $K_2O$-$Al_2O_3$-$P_2O_5$-$SiO_2$ glass article was secured by firing the porous body at 800° C. for 15 minutes.

These examples clearly demonstrate that certain inorganic salts will, when added to silicate solutions, colloidal solutions, or suspensions, hydrolyze and form products which will reduce the pH of the particular solution and cause the silica to polymerize. One of the chief advantages of the use of inorganic salts for the polymerization of silica, as opposed to the use of organic esters, is that specific metal oxides desirable for any one or more of several purposes, e.g., as a glass constituent, as an opacifying agent, to alter the physical properties of the final product, etc., and which are products of the hydrolysis can be left in the solid after gelation. Thereafter, when the reacted or porous body is fired to a glass article, those oxides will remain therein. In this manner, a glass of controlled composition can be produced.

One of the principal criteria demanded in the selection of the inorganic salt is that the silica will polymerize and competitive substances such as crystalline silicates will not form. The criteria for the silicate solutions are the same as those required in the reactions with the organic esters, viz., a minimum silica concentration of 1 mole/liter and a pH greater than 10.

In order to control the reaction, the salt should not produce essentially instantaneous gelation since such would not be uniform throughout the solution. Therefore, from that point of view, the salt can be characterized in the following manner. First, the solution, colloidal solution, or suspension of the salt could have a pH slightly below that pH which fosters polymerization. Such would thereby provide a uniform and sufficiently slow reaction rate. Contrarywise, a salt having a very low solubility but having the capability of hydrolyzing to a pH significantly lower than 10, would also be acceptable inasmuch as its slow dissolution rate would, in turn, control the rate of reaction. Second, it is preferable that the inorganic salt be useful in the final glass composition and, therefore, able to react at a low temperature to produce a glass. Hence, salts which will yield divalent or trivalent oxides capable of acting as network modifiers in glass are generally desirable. Examples IX–XXI illustrated the successful employment of carbonates, borates, hydroxides, and phosphates of several bivalent and trivalent metal ions.

In general, then, the operable inorganic salts will yield solutions, colloidal solutions, or suspensions having a pH less than 10 and will not react in a manner to form a crystalline precipiate rather than a polymerized silica network.

Examples IX–XXI illustrate that the polymerized gel can be treated in such a way as to first remove the water and other volatiles and then fired at a temperature high enough to fuse to a glass. In that practice, the various nonvolatile oxides such as the divalent and trivalent oxides and any alkali metal oxides will remain in and contribute to the properties of the final porous or glassy body. Nevertheless, where desired, the cured gel may be leached with a suitable solvent or selectively volatilized so as to leave a porous silica body. Then, depending upon the solvent selected, the porous body may or may not contain the divalent, trivalent, or alkali metal oxides. The porous body will have a total porosity and pore size similar to that disclosed above with respect to such formation utilizing esters. Finally, the so-formed porous article can be thereafter fired to sinter it to a solid glass article. This latter sintering technique frequently requires much higher temperatures than the preferred approach of firing an unleached body.

We have learned that, in general, at least about 2% by weight of the inorganic salt should be present to insure the reduction of the pH below 10 and polymerization of the $SiO_2$ to a gel with about 5–10% by weight being the preferred amount. Additions of amounts more than 20% by weight are not necessary for the required reaction but can be useful where it is desired to utilize the salt itself as a filler material in the final product.

In a further modification of the final product, various inert fillers may be included in the initial reaction mixture to vary the mechanical and/or electrical and/or chemical properties thereof. For example, inorganic fibers such as SiC or $Al_2O_3$ could be incorporated to improve the mechanical strength of the product and metal particles could be added to enhance the electrical and thermal properties of the product.

We claim:
1. A method for making a self-supporting, uniform, monolithic, porous silicate article which comprises the steps of:
   (a) preparing true solutions and/or colloidal solutions and/or suspensions having a pH between about 10–15 and containing about 1–12 moles of $SiO_2$/liter in solution from silica solutions selected from the group consisting of a quaternary ammonium silicate, colloidal silica, and mixtures thereof together or with alkali metal silicates;
   (b) reacting a substance therewith which hydrolyzes to a weak acid thereby reducing the pH of the solution selected from the group consisting of methyl formate, ethyl formate, methyl acetate, ethyl acetate, and mixtures thereof in an amount of about 2–20% by volume and a relatively water-insoluble carbonate and/or hydroxide and/or borate and/or phosphate of magnesium, lead, zinc, chromium, lanthanum, and aluminum in an amount of about .2–20% by weight at a temperature between the freezing point and the boiling point of the solution for a sufficient length of time to reduce the pH to about 7–10 and polymerize the $SiO_2$ to a gel; and then
   (c) air drying said gel to a self-supporting uniform, monolithic, porous article.
2. A method according to claim 1 wherein said true solutions and/or colloidal solutions and/or suspensions contain about 3–12 moles of $SiO_2$/liter in solution.
3. A method according to claim 1 wherein said alkali metal silicates are selected from the group consisting of lithium silicate, sodium silicate, and potassium silicate, and mixtures thereof.
4. A method according to claim 1 wherein the reaction temperature is between room temperature and 100° C.
5. A method according to claim 1 wherein the time sufficient to reduce the pH below about 10 and polymerize the $SiO_2$ ranges between about 5 seconds to 24 hours.
6. A method according to claim 1 wherein said air drying is undertaken at temperatures ranging between room temperature and the deformation temperature of the article.
7. A method for making uniform solid silicate glass articles which comprises the steps of:
   (a) preparing true solutions and/or colloidal solutions and/or suspensions having a pH between about 10–15 and containing about 1–12 moles of $SiO_2$/liter in solution from silica solutions selected from the group consisting of a quaternary ammonium silicate, colloidal silica, and mixtures thereof together or with alkali metal silicates;
   (b) reacting a substance therewith which hydrolyzes to a weak acid thereby reducing the pH of the solution selected from the group consisting of methyl formate, methyl acetate, ethyl formate, ethyl acetate, and mixtures thereof in an amount of about 2–20% by volume, and a relatively water-insoluble carbonate and/or hydroxide and/or borate and/or phosphate of magnesium, lead, zinc, chromium, lanthanum, and aluminum in an amount of about 2–20% by weight at a temperature between the freezing point and the boiling point of the solution for a sufficient length of time to reduce the pH to between about 7–10 and polymerize the $SiO_2$ to a gel; and then (c) firing said gel to a temperature in the vicinity of of the softening point of the particular composition for a sufficient length of time to consolidate a solid silicate glass article.

8. A method according to claim 7 wherein said true solutions and/or colloidal solutions and/or suspensions contain about 3–12 moles of $SiO_2$/liter in solution.

9. A method according to claim 7 wherein said alkali metal silicates are selected from the group consisting of lithium silicate, sodium silicate, potassium silicate, and mixtures thereof.

10. A method according to claim 7 wherein the reaction temperature is between room temperature and 100° C.

11. A method according to claim 7 wherein the time sufficient to reduce the pH below about 10 and polymerize the silica ranges between about 5 seconds to 24 hours.

12. A method according to claim 7 wherein said firing is undertaken at temperatures between about 500°–1500° C.

13. A method according to claim 7 wherein the time sufficient to consolidate the article varies between about 5–60 minutes.

14. A self-supporting, monolithic, porous, silicate article produced in accordance with claim 1.

15. A solid silicate glass article produced in accordance with claim 7.

References Cited

UNITED STATES PATENTS

| | | | |
|---|---|---|---|
| 3,012,405 | 12/1961 | Caron | 106—74 |
| 3,138,471 | 6/1964 | Wygant | 106—84 |
| 3,558,506 | 1/1971 | Bonnel et al. | 106—74 |
| 3,678,144 | 7/1972 | Shoup | 106—74 |

JAMES E. POER, Primary Examiner

U.S. Cl. X.R.

106—40 R, 75